US006784592B2

(12) United States Patent
Hartwell

(10) Patent No.: US 6,784,592 B2
(45) Date of Patent: Aug. 31, 2004

(54) USE OF STANDOFFS TO PROTECT ATOMIC RESOLUTION STORAGE MOVER FOR OUT-OF-PLANE MOTION

(75) Inventor: Peter G. Hartwell, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 99 days.

(21) Appl. No.: 09/854,599

(22) Filed: May 15, 2001

(65) Prior Publication Data

US 2002/0171326 A1 Nov. 21, 2002

(51) Int. Cl.$^7$ ................................................. H02N 1/00
(52) U.S. Cl. ......................................................... 310/309
(58) Field of Search .................................... 310/309, 12

(56) References Cited

U.S. PATENT DOCUMENTS 5,604,392 A * 2/1997 Vig ............................. 310/309

FOREIGN PATENT DOCUMENTS

JP          8-51786    * 2/1996    ............ H02N/1/00
JP          9-163761   * 6/1997    ............ H02N/1/00

OTHER PUBLICATIONS

Translation of JP 08–51786, Feb. 20, 1996.*
Storrs Hoen, et al., "Electrostatic Surface Drives: Theoretical Considerations and Fabrication", Chicago, Jun. 16–19, 1997, pp. 41–44, Transducers, International Conference On Solid–State Sensors and Actuators, 1997.
D.A. Horsley, et al., "Multi–Degree of Freedom Dynamic Characterization of Deep–Etched Silicon Suspension", Hilton Head Island, South Carolina, Jun. 4–8, 2000, pp. 81–84, Solid–State Sensor and Actuator Workshop.

* cited by examiner

Primary Examiner—Karl Tamai

(57) ABSTRACT

A micro-machined actuator for use in, among other things, sensors and data storage devices. The actuator includes a stator wafer and a micro-mover positioned adjacent to the stator wafer. Between the stator wafer and the micro-mover are electrodes that are set to specified voltages and that emanate electric fields that position the micro-mover relative to the stator wafer. Also between stator wafer and the micro-mover are bumpers that prevent the electrodes from coming into contact with each other.

12 Claims, 5 Drawing Sheets

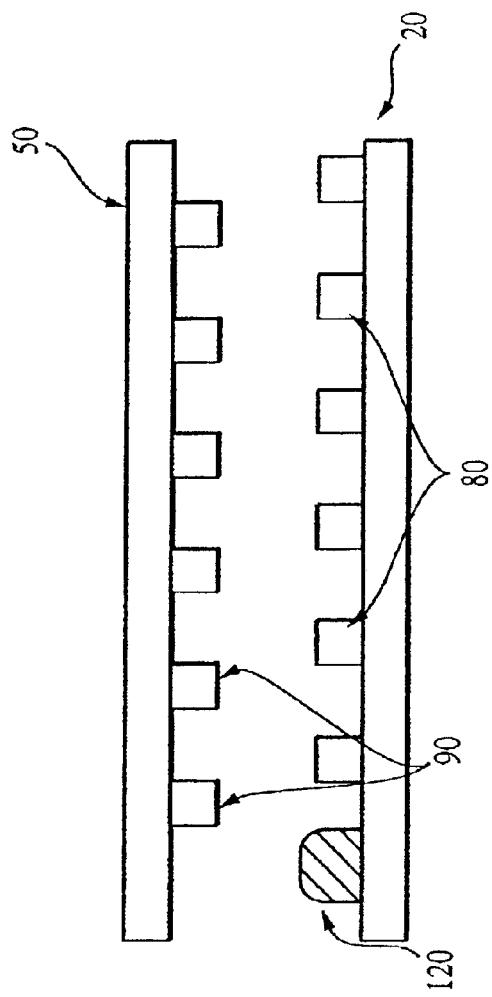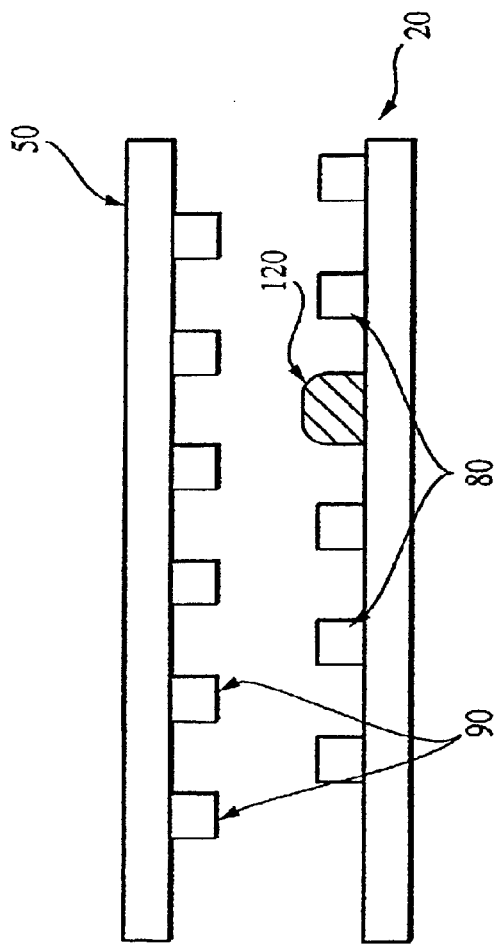
FIG. 3
FIG. 4

USE OF STANDOFFS TO PROTECT ATOMIC RESOLUTION STORAGE MOVER FOR OUT-OF-PLANE MOTION

BACKGROUND OF THE INVENTION:

1. Field of the Invention

The present invention relates generally to micro-machined actuators. The present invention also generally relates to methods for manufacturing and operating micro-machined actuators.

2. Description of the Related Art

FIG. 1 illustrates a micro-machined actuator 10 according to the related art. The actuator 10 illustrated includes a stator wafer 20 at the bottom thereof and a rotor wafer 40 above the stator wafer 20. The rotor wafer 40 includes a section, called a micro-mover 50, that is separated from the rest of the rotor wafer 40. The micro-mover 50 is connected to the rest of the rotor wafer 40 via suspensions 60. The wafers 20,40 are bonded together by a bond material 70 that both holds the wafers 20,40 together and separates them a specified distance.

On the surface of the stator wafer 20 closest to the rotor wafer 40 is a series of stator electrodes 80. On the surface of the micro-mover 50 closest to the stator wafer 20 are formed a series of actuator electrodes 90. Although, for the purposes of clarity, only five stator electrodes 80 and four actuator electrodes 90 are illustrated in FIG. 1, typical micro-machined actuators 10 according to the related art include many more electrodes 80,90 than those illustrated.

The stator wafer 20 typical contains the electronics of the actuator 10 and makes up half of the motor that moves the micro-mover 50, as will be discussed below. The stator wafer 20 is typically made from materials that can be micro-machined (e.g., silicon).

The rotor wafer 40 is typically on the order of 100 microns thick. The rotor wafer 40 must also be micro-machinable, hence it too is often made from silicon. As stated above, the micro-mover 50 generally consists of a portion of the rotor wafer 40 that has been separated from the remainder of the rotor wafer 40 but that remains attached by suspensions 60. Hence, the micro-mover 50 is also typically on the order of 100 microns thick and made from a micro-machinable material.

The suspensions 60 are designed to allow the micro-mover 50 to have in-plane motion while restricting the micro-mover 50 out-of-plane motion. In other words, the suspensions 60 are designed to allow the micro-mover 50 to move horizontally relative to the stator wafer 20 and to restrict the micro-mover 50 from moving vertically. A variety of suspensions 60 are known in the art and are designed with different amounts of in-plane compliance and out-of-plane stiffness. However, none of these suspensions 60 can prevent out-of-plane motion completely.

The bond material 70 typically is a metallic, thin-film material. The type of bond material 70 used depends upon several factors. Commonly, the bond material 70 is chosen so as to provide electrical conductivity between the various wafers 20, 40. The bond material 70 is also chosen on its ability to hermetically seal the chamber in which the micro-mover 50 resides.

The stator electrodes 80 consist of inter-digitated metal lines formed on the surface of the stator wafer 20 closest to the micro-mover 50. The actuator electrodes 90 are another set of inter-digitated metal lines formed on the micro-mover 50. Each metal line that makes up an electrode 80,90 is approximately one to two microns wide and can have a length of up to one or two millimeters. A one to two micron gap typically exists between any two electrodes 80,90.

The actuator electrodes 90 typically cover a substantial portion of the micro-mover 50, which itself can have a total area of between one and two square millimeters. The electrodes 80,90 can be made up of various metals that are generally compatible with semiconductors. Such metals include, but are not limited to, molybdenum, aluminum and titanium.

FIG. 2 illustrates a cross-sectional view of a micro-machined actuator 10 taken across the plane A—A defined in FIG. 1. In operation, the actuator 10 operates by moving the micro-mover 50 relative to the stator wafer 20. In order to move the micro-mover 50 relative to the stator wafer 20, the voltages of selected stator electrodes 80 and actuator electrodes 90 are raised and lowered in a specific pattern in order to alter the electric fields emanating from the electrodes 80,90.

For example, the actuators electrodes 90 can have their voltages set in a pattern where a first electrode 90 would be placed at an operating voltage such as 40 volts, the electrode 90 adjacent to it would be grounded, the next electrode 90 would be at 40 volts, and the remaining electrodes would have their voltages set in a similar manner. The stator 80, on the other hand, could have their voltages set in a pattern that is not quite alternating. For example, a first stator electrode 80 could be set to a high voltage, a second stator electrode 80 immediately adjacent to the first could be set to a low voltage, a third stator electrode 80 adjacent to the second could be set to a high voltage, a fourth stator electrode 80 adjacent to the third could be set to a low voltage, adjacent fifth and sixth stator electrodes 80 could be set to high voltages and a seventh adjacent stator electrode 80 could be set to a low voltage. This seven-electrode 80 voltage pattern could then be repeated for all of the stator electrodes 80 in the actuator 10.

In order to move the micro-mover 50, the pattern of the voltages in the stator electrodes 80 is changed by increasing or decreasing the voltage on one or more of the stator electrodes 80. Such voltages changes alter the distribution of the electric fields present between the stator electrodes 80 and actuator electrodes 90. Therefore, the attractive and repulsive forces between the stator electrodes 80 and actuator electrodes 90 are also altered and the position of the micro-mover 50 is changed until these forces are balanced.

In other words, as the stator electrode 80 voltages are changed, new, low-energy potential regions are created where the forces generated by the electric fields balance the mechanical forces exerted on the micro-mover 50 by the suspensions 60. Hence, once the voltages of the stator electrodes 80 have been changed to a new pattern, the micro-mover 50 repositions itself.

An unwanted side effect of the electric fields is the out-of-plane component of the attractive forces between the stator electrodes 80 and the actuator electrodes 90. These attractive forces pull the micro-mover 50 towards the stator wafer 20 and, if too great, allow the actuator electrodes 90 and stator electrodes 80 to come into close enough contact that they electrically "short out" and fuse together. Such an event causes catastrophic failure of the actuator 10.

Although the suspension 60 is designed to be sufficiently stiff to restrict the out-of-plane movement of the micro-mover 50, it is difficult to design a suspension 60 that simultaneously provides the required in-plane mobility of the micro-mover 50 and restricts out-of-plane motion. Hence, to date, micro-machined actuators 10 have been susceptible to catastrophic failure.

Fusing of the stator electrodes 80 and the actuators electrodes 90 can also occur if an external jolt is applied to the system. For example, if the micro-chip that contains the micro-machined actuator 10 is tapped or jolted, enough additional physical force in the out-of-plane direction could be transferred to the micro-mover 50 and stator wafer 20 configuration to sufficiently overcome the suspension 60 stiffness and to fuse together the stator electrodes 80 and actuator electrodes 90.

Hence, what is needed is a micro-actuator that prevents out-of-plane motion of the micro-mover relative to the stator wafer.

What is also needed is a micro-actuator capable of being tapped or jolted, for example, without having the outside force cause catastrophic failure of the device.

BRIEF SUMMARY OF THE INVENTION

According to one embodiment, an actuator that includes a stator wafer, a first stator electrode protruding from a first surface of the stator wafer, a micro-mover above the first surface of the stator wafer, a first actuator electrode protruding from a first surface of the micro mover, wherein the first surface of the micro-mover and the first surface of the stator face each other, and a first bumper positioned between the stator wafer and the micro-mover.

According to another embodiment, a method of operating a micro-mover that includes providing a stator wafer and a micro-mover over the stator wafer, forming stator electrodes on the stator wafer and actuator electrodes on the micro-mover, moving the micro-mover relative to the actuator electrode by altering the voltages of selected stator electrodes over time, and preventing physical contact between the stator electrodes and actuator electrodes.

According to yet another embodiment, a method of manufacturing an actuator that includes providing a stator with stator electrodes on a first surface of the stator, providing a micro-mover with actuator electrodes on a first surface of the micro-mover, positioning the first surface of the micro-mover facing the first surface of the stator, and providing a bumper between the stator and the micro-mover.

BRIEF DESCRIPTION OF THE DRAWING

The invention will be described by way of example, in the description of exemplary embodiments, with particular reference to the accompanying drawings in which:

FIG. 3 illustrates a cross-sectional view of a micro-machined actuator wherein a bumper is positioned next to a set of stator electrodes;

FIG. 4 illustrates a cross-sectional view of a micro-machined actuator wherein a bumper is positioned in between a set of stator electrodes;

DETAILED DESCRIPTION OF THE INVENTION

FIG. 3 illustrates one embodiment of the present invention wherein the stator wafer 20 surface closest to the micro-mover 50 has upon it not only stator electrodes 80 but also a bumper 120. Although the bumper 120 is positioned adjacent to only one stator electrodes 80, this configuration is not restrictive of the present invention. In fact, as shown in FIG. 4, the bumper 120 can easily be position between any two of the stator electrodes 80.

Figure 1:
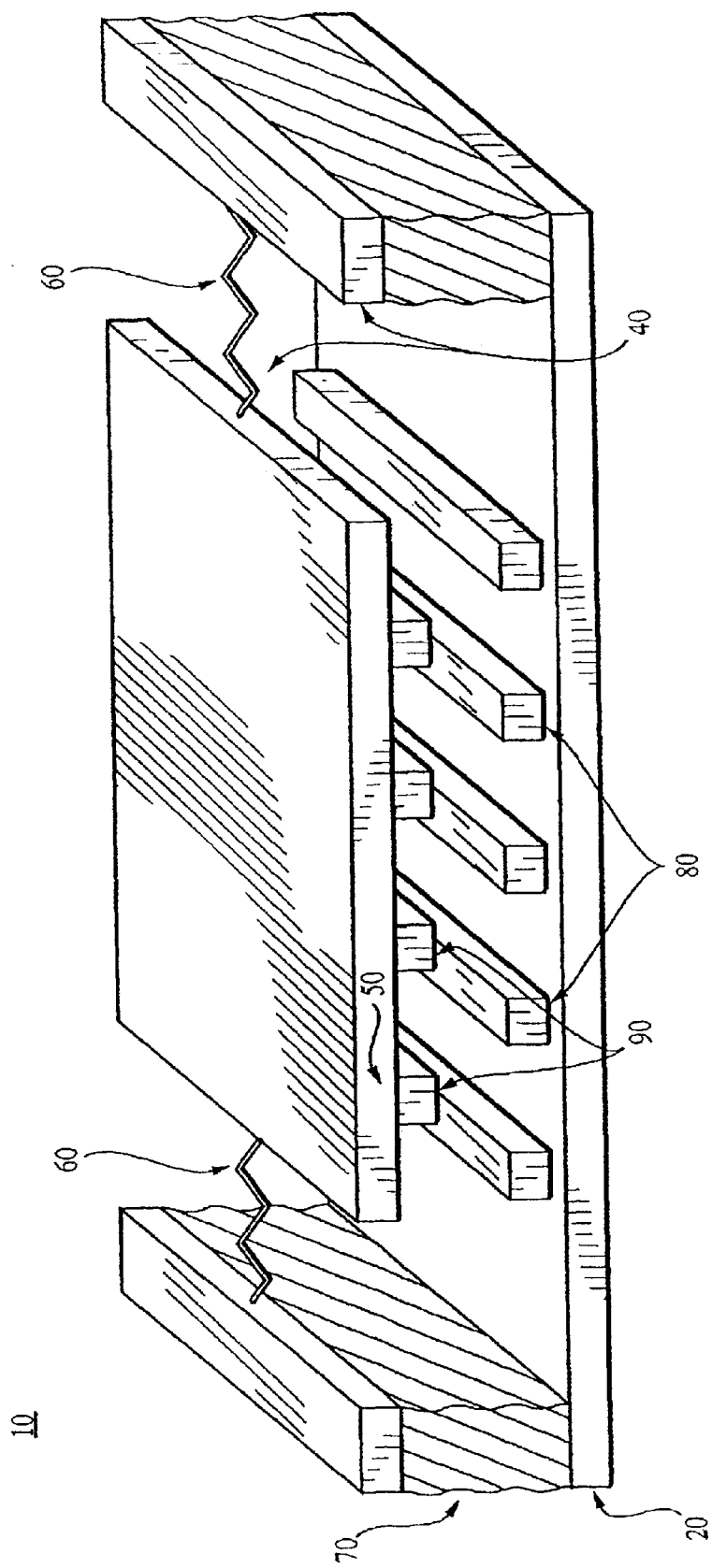
FIG. 1 illustrates a perspective view of a micro-machined actuator according to the related art.
Figure 2:
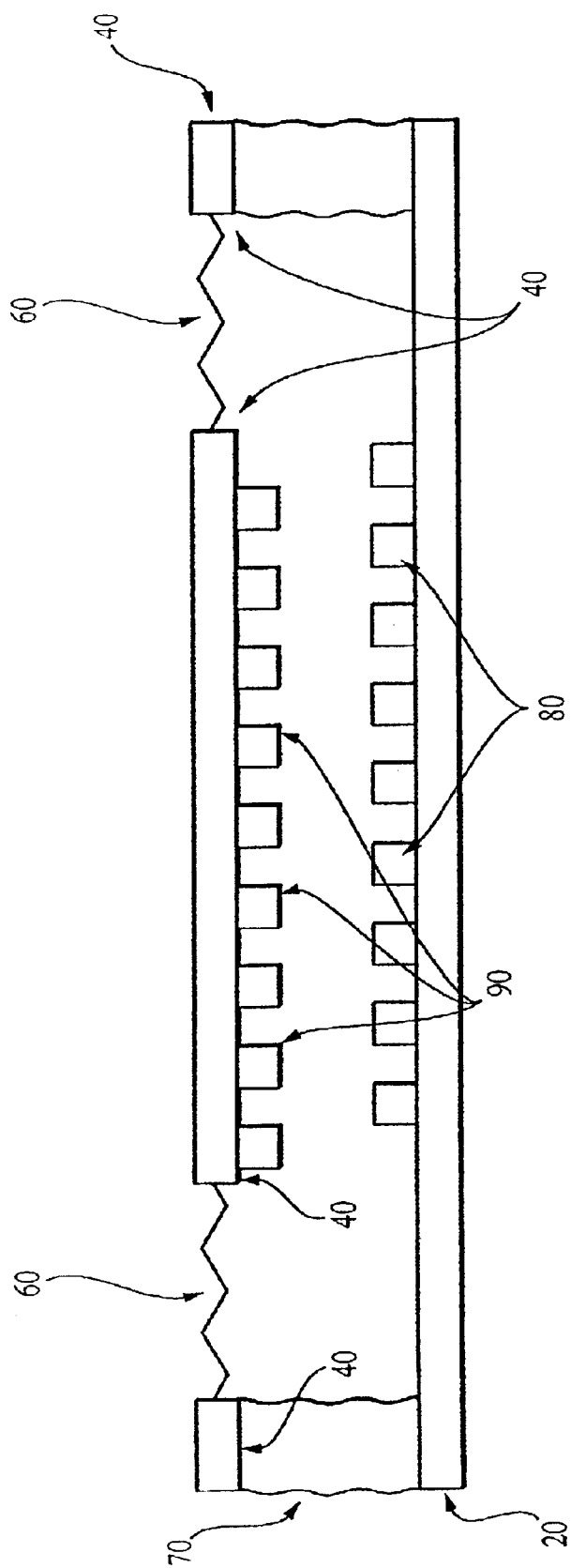
FIG. 2 illustrates a cross-sectional view of a micro-machined actuator illustrated in FIG. 1 as seen from line A—A.
Figure 5:
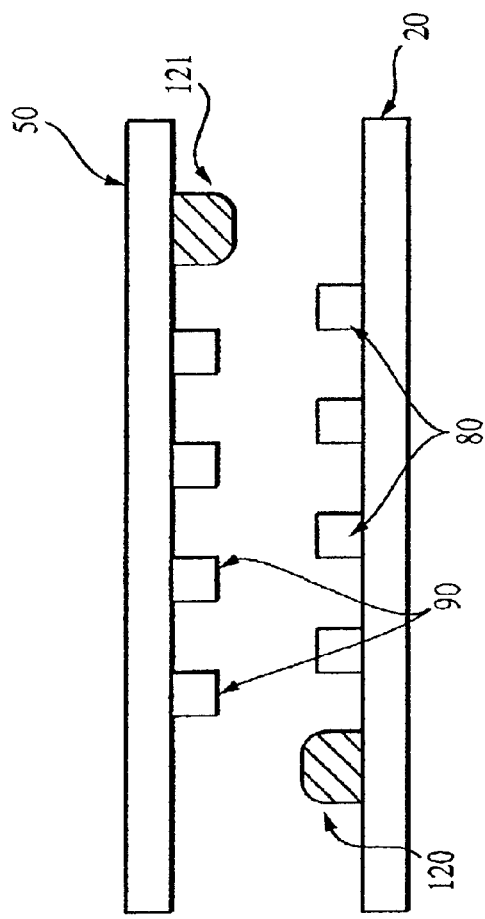
FIG. 5 illustrates a cross-sectional view of a micro-machined actuator wherein a first bumper is positioned next to a set of stator electrodes and a second bumper is positioned next to a set of actuator electrodes.

FIG. 5 illustrates another embodiment of the present invention with two bumpers, a first bumper 120 on the surface of the stator wafer 20 closest to the micro-mover 50, and a second bumper 121 on the surface of the micro-mover 50 closest to the stator wafer 20. Although both bumpers 120,121 illustrated in FIG. 5 are positioned to the outside of the electrodes 80,90, either or both of the bumpers can be positioned between two electrodes 80,90, as shown in FIG. 4.

Figure 6A:
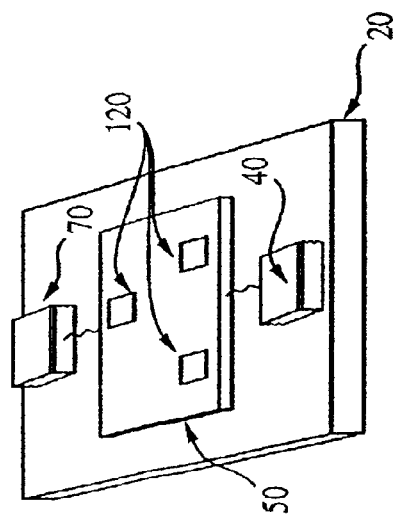
FIG. 6A illustrates a top perspective view of a micro-machined actuator wherein three bumpers are included.
Figure 6B:
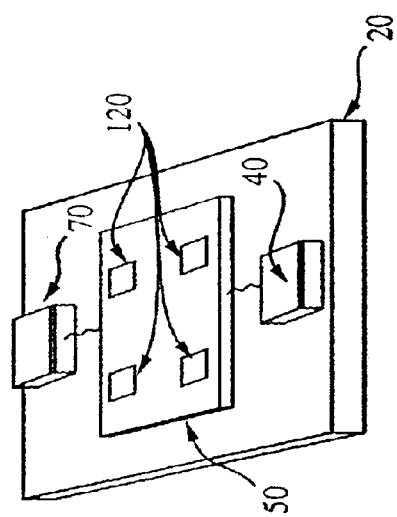
FIG. 6B illustrates a top perspective view of a micro-machined actuator wherein four bumpers are included.

FIGS. 6A and 6B illustrate yet other embodiments of the present invention wherein three and four bumpers 120 are present in a micro-machined actuator 10. In FIG. 6A, the three bumpers 120 are arranged in a triangular configuration. Dependent upon the particular embodiment of the present invention, each of the three bumpers 120 can be positioned either on the stator wafer 20 or on the micro-mover 50. For example, a first and second bumper can be positioned on the stator wafer 20 while a third bumper can be positioned on the micro-mover 50. Also, each of the bumpers 120 can be positioned either adjacent to one electrode 80,90 or between two electrodes 80,90.

In FIG. 6B, four bumpers 120 are positioned in a square or rectangular configuration wherein each bumper 120 can be either on the stator wafer 20 or the micro-mover 50. Each of the bumpers 120 can be adjacent to one electrode 80,90 or positioned between two electrodes 80,90.

In addition to the configurations illustrated in FIGS. 6A and 6B, more than four bumpers 120 can also be positioned between the stator wafer 20 and micro-mover 50. Regardless of how many bumpers 120 are present, no limitations are made regarding the geometric arrangement of the bumpers 120. For example, although FIG. 6A shows the bumpers 120 to be in a triangular configuration, the three bumpers 120 can be in a linear, random, or other geometrical configuration. The same is true for the four bumpers 120 illustrated in FIG. 6B and for higher-bumper number embodiments of the present invention.

According to the embodiments illustrated in FIGS. 3-6B, each of the bumpers 120 protrude a greater distance from the surfaces to which they are attached than the electrodes 80,90 protruding from those same surfaces. Although no particular restrictions are placed on how far the bumpers 120 and electrodes 80,90 protrude from their respective surfaces, certain embodiments of the present invention provide for the electrodes 80,90 to protrude 75% as far as the bumpers 120. Other embodiment of the present invention have electrodes 80,90 that protrude from the surfaces to which they are attached 90%, 50%, 10%, 5% and 1% as far as the bumpers 120 attached to the same surfaces.

Figure 7A:
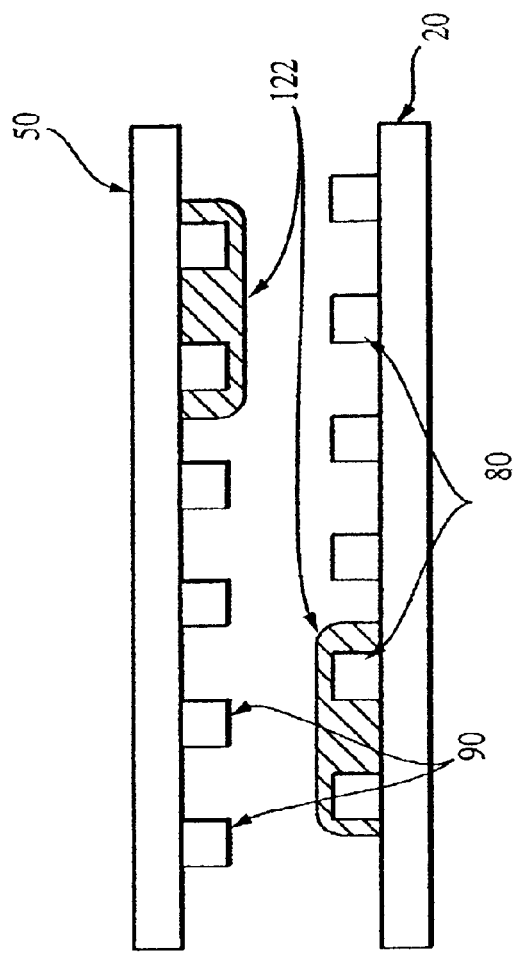
FIGS. 7A–7B illustrate a cross-sectional and top perspective view, respectively, of bumpers that overlap one or more electrodes.
Figure 7B:
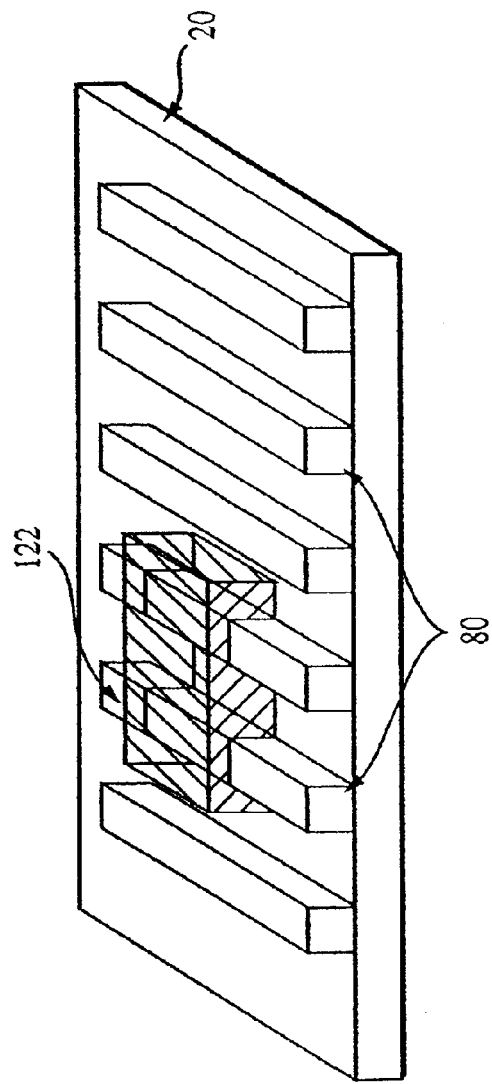

The bumpers 120 can be made from many different materials and are not restricted in its geometry. Hence, the bumpers 120 can be circular protrusions, square protrusions, or protrusions of other geometrical shapes. Also, although the bumpers 120 discussed above have been either adjacent to one electrode 80,90 or positioned between two electrodes 80,90, certain embodiments of the present invention include bumpers 123 that overlap at least portions of one or more electrodes 80,90. Such a configuration is shown in FIGS. 7A and 7B, where FIG. 7A illustrates a cross-sectional view of an actuator 10 and FIG. 7B illustrates a top perspective view of the surface of the stator wafer 20 that contains stator electrodes 80. The bumper 122 is shown in FIG. 7B as overlapping two stator electrodes 80 partially.

For the purposes of simplicity, the bumpers described above are preferably made from the same material as the surface from which they protrude. However, this is in no way restrictive of the present invention and the bumpers, according to certain embodiments, can be made from materials different from those of the surfaces from which they protrude. For example, metal, insulator, dielectric, semiconductor or polymer bumpers could be formed on the surface of a semiconductor stator wafer 20. According to certain embodiments of the present invention, electrically grounded metal bumpers are used.

The overall dimensions of the bumper 120 are typically on the order of microns, though these dimensions are in no way limiting of the present invention. In fact, if the electrodes 80,90 were made from nanowires, the bumper 120 could have nanometer dimensions.

Although it was mentioned above that, without the bumper 120 positioned between the micro-mover 50 and the stator wafer 20, the actuator electrodes 90 and stator electrodes 80 could fuse, the actual method of fusion was not described. For the sake of completeness, the fusion occurs as, when the electrodes 80,90 come in close enough contact to each other, a current path forms between the electrodes 80,90 and the electrodes 80,90 melt together.

The actuator described above can be included in many types of devices. For example, any micro-machine or nano-machine having a suspended platform above a surface is within the scope of the present invention. This includes, but is not limited to, all sorts of sensors, data storage devices, and other devices that require micro-actuators.

The distance separating the micro-mover 50 and stator wafer 20 is generally on the order of 1–10 microns. However, this is in no way limiting of the present invention and any actuator wherein the electrodes 80,90 can exert enough force on each other to move the micro-mover 50 without coming into such close contact that they fuse together are also within the scope of the present invention.

One method of manufacturing some of the actuators within the scope of the present invention includes forming stator electrodes 80 on a first surface of a stator wafer 20. Then, a micro-mover 50 is formed and positioned adjacent to the first surface of the stator wafer 20. On the surface of the micro-mover 50 closest to the stator wafer are formed actuator electrodes 90. At least one bumper 120 is formed on either the first surface of the stator wafer 20 or of the micro-mover 50. This bumper 120 can be formed by selective etching, deposition, or another method of forming a protrusion from a surface.

The foregoing detailed description has been given for understanding exemplary implementations of the invention only and no unnecessary limitations should be understood therefrom as modifications will be obvious to those skilled in the art without departing from the scope of the appended claims and their equivalents.

What is claimed is:

1. An actuator comprising:
   a stator wafer;
   a micro-mover above said stator wafer;
   one or more stator electrodes protruding from a section of a stator wafer surface wherein said section of said stator wafer surface is a substantially flat, continuous plane that is closest to said micro-mover, and wherein said one or more stator electrodes protrude from the same flat, continuous plane on said stator wafer surface;
   one or more actuator electrodes protruding from a section of a micro-mover surface, wherein said section of said micro-mover surface is a substantially flat, continuous plane that is closest to said stator wafer, and wherein said one or micro-mover electrodes protrude from the same flat, continuous plane on said micro-mover surface; and
   one or more bumpers positioned on said stator wafer surface or said micro-mover surface or both surfaces, wherein at least one bumper comprises a metal.

2. The actuator of claim 1, wherein said one or more stator electrodes include a first stator electrode and a second stator electrode, and wherein at least one of said one or more bumpers protrude from said stator wafer surface between said first and second stator electrodes.

3. The actuator of claim 2, said one or more bumpers protrude from said stator wafer surface at least twice as much as said one or more stator electrodes.

4. The actuator of claim 1, wherein said one or more actuator electrodes include a first actuator electrode and a second actuator electrode, and wherein at least one of said one or more bumpers protrude from said micro-mover surface between said first and second actuator electrodes.

5. The actuator of claim 4, wherein said one or more bumpers protrude from said micro-mover surface at least twice as far as said one or more actuator electrode.

6. The actuator of claim 1, wherein said at least one bumper is further comprises a dielectric.

7. The actuator of claim 1, wherein said one or more bumpers are positioned on both said stator wafer surface and said micro-mover surface.

8. The actuator of claim 1, wherein the metal of said at least one bumper is electrically grounded.

9. The actuator of claim 1, wherein said one or more bumpers comprise a plurality of discreet posts, and wherein the number of bumpers is equal to or smaller than, the number of electrodes on the same surface.

10. The actuator of claim 9, wherein said plurality of discreet posts are positioned on said stator wafer surface or said micro-mover surface to form a triangular pattern across the same surface.

11. The actuator of claim 9, wherein said plurality of discreet posts are positioned on said stator wafer surface or said micro-mover surface to form a square pattern across the same surface.

12. The actuator of claim 1, wherein said one or more bumpers comprises at least one bumper overlying at least a portion of at least one of said stator electrodes or said actuator electrodes.

* * * * *